June 24, 1930.  H. K. BURDICK  1,767,047
VELOCIPEDE
Filed Aug. 24, 1927
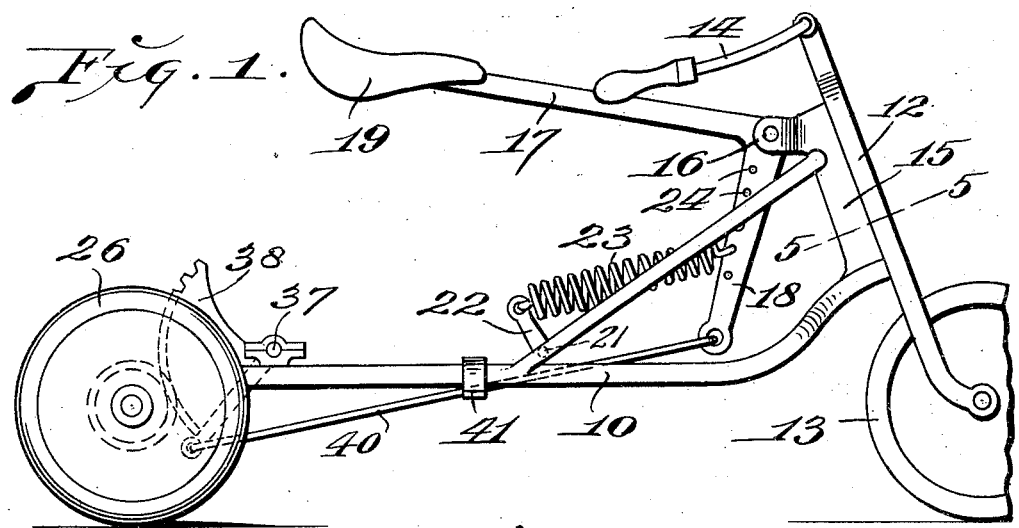
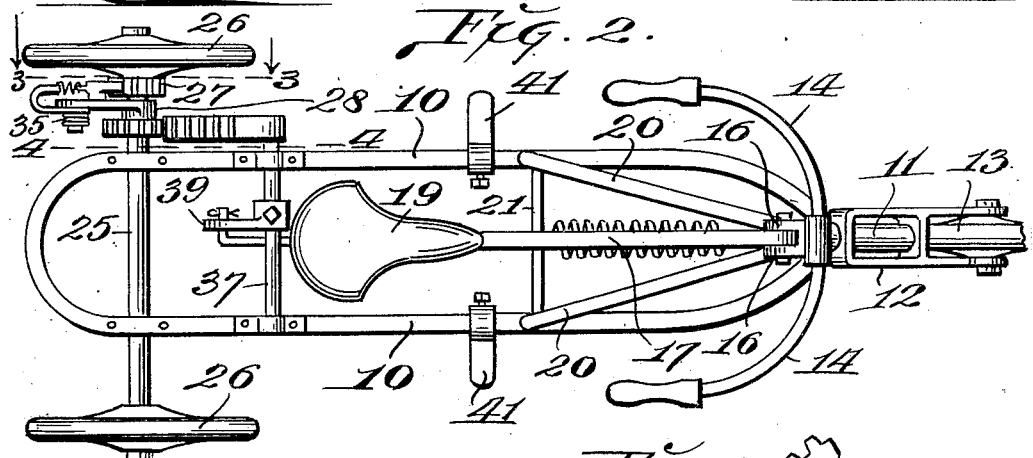
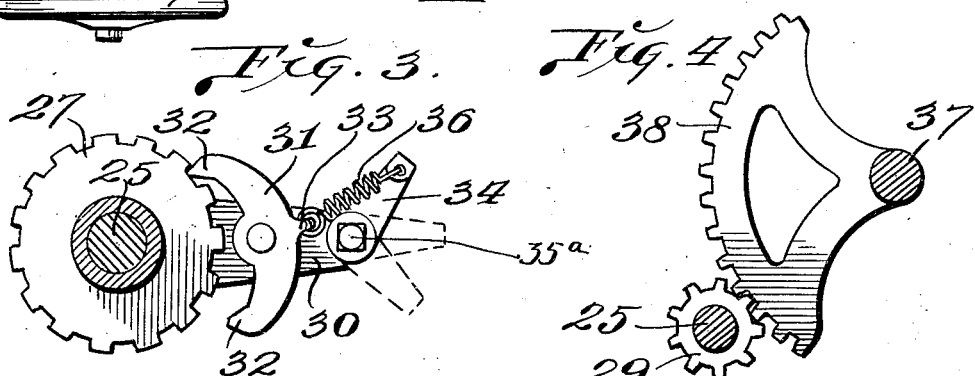
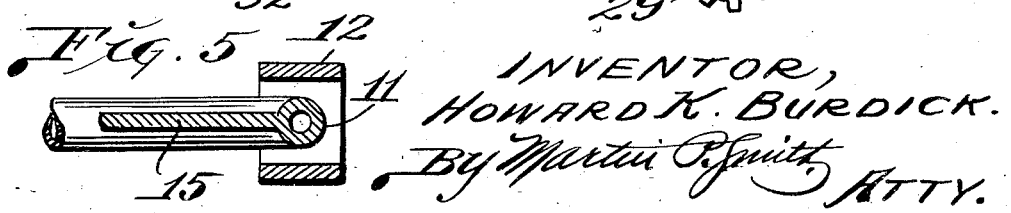
INVENTOR,
HOWARD K. BURDICK.
By Martin P. Smith ATTY.

Patented June 24, 1930

1,767,047

UNITED STATES PATENT OFFICE

HOWARD K. BURDICK, OF LOS ANGELES, CALIFORNIA

VELOCIPEDE

Application filed August 24, 1927. Serial No. 215,074.

My invention relates to a velocipede and has for its principal object, the provision of a relatively simple, practical and inexpensive velocipede that is driven through a system of associated levers and gearing, and one of which levers serves as a support for the seat that is occupied by the operator of the vehicle.

A further object of my invention is to provide a velocipede wherein the operations or movements of the operator in driving the velocipede forwardly, very closely simulate or approach the movements of a person riding horseback, and thus the operation of the velocipede involves a certain degree of mild exercise combined with the pleasing effects resulting from the forward travel of the vehicle.

With the foregoing and other objects in view, my invention consists in certain novel features of construction and arrangement of parts that will hereinafter be more fully described and claimed and illustrated in the accompanying drawing, in which:

Fig. 1 is a side elevational view of a velocipede of my improved construction.

Fig. 2 is a plan view of the velocipede.

Fig. 3 is an enlarged cross section taken on the line 3—3 of Fig. 2.

Fig. 4 is an enlarged cross section taken on the line 4—4 of Fig. 2.

Fig. 5 is an enlarged cross section taken on the line 5—5 of Fig. 1.

Referring by numerals to the accompanying drawings, which illustrate a practical embodiment of my invention, 10, 10 designate the side members of a horizontally disposed frame, which side members are preferably formed of metal and their forward portions being bent inwardly and upwardly and the terminal portions of these bent forward ends are integrally connected to each other and to the lower end of a substantially upright tubular member 11.

The upper and lower ends of the tubular member 11 are journaled in suitable bearings that are formed integral with a steering yoke 12, the lower portion of which carries a steering wheel 13 and extending rearwardly from the upper portion of the yoke are handle bars 14.

Formed integral with and projecting rearwardly from tube 11 is a plate 15 and projecting rearwardly from the upper end of said plate is a pair of ears 16 to which is fulcrumed a bell crank member including a rearwardly projecting long arm 17, and a downwardly projecting shorter arm 18. Mounted on the rear portion of the longer arm 17 is a rider's seat 19 preferably having the general form of a saddle.

Projecting forwardly and upwardly from the intermediate portions of the side members 10 of the frame are braces 20, the upper ends of which are rigidly connected to the upper portion of plate 15 and arranged between the lower portions of these braces is a cross bar 21 having at its center an upwardly projecting bracket 22 and connected to the latter is one end of a retractile coil spring 23, the forward end thereof being detachably seated in one of a series of apertures 24 that are formed in the short arm 18 of the bell crank. By having a series of apertures 24 the spring 23 may be connected to arm 18 at different points with the result that the tension of said spring is varied.

Secured to the rear portion of the frame comprising the side members 10 is a transversely disposed axle 25 on the ends of which are journaled small wheels 26 and formed integral with the hub of one of these wheels is a ratchet wheel 27. Loosely mounted on the axle 25 adjacent to the ratchet wheel 27 is a sleeve 28 with the inner end of which is formed integral a pinion 29, and projecting rearwardly from the outer end of said sleeve is an arm 30.

Pivotally mounted on arm 30 is a pawl 31 provided at both ends with teeth 32 that are adapted to engage the teeth of ratch wheel 27 and projecting rearwardly from the center of this pawl is an eye 33.

Pivotally mounted on the outer portion of arm 30 is a short arm or hook 34 that is restrained against free movement by a series of friction disks 35 that is arranged on the bolt 35ª upon which said arm or hook is pivoted. Secured to the outer end of the arm or hook 34 is one end of a retractile spring 36, the inner end of which is connected to eye 33 on the pawl.

Journalled in suitable bearings on the rear portion of members 10 of the frame is a transversely arranged shaft 37, one end of which carries a toothed segment 38 that engages pinion 29 and secured to and projecting downwardly from the central portion of shaft 37 is an arm 39.

Pivotally connected to the lower portion of arm 39 is the rear end of a rod 40, the forward end of which is pivotally connected to the lower end of the short arm 18 of the bell crank.

Adjustably mounted on the intermediate portions of the side members 10 of the frame are short outwardly projecting arms 41 that function as supports or rests for the feet of the operator of the velocipede.

The operator of the vehicle sits astride the saddle 19 with the feet resting on the supports 41 and with the hands engaging the handles on bars 14. To bring about a forward movement of the velocipede the operator by downward pressure of the feet on the rests 41 raises himself from the seat 19 and under the influence of spring 23 the bell crank comprising the arms 17 and 18 will swing upon its fulcrum, thereby moving rod 40 rearwardly and swinging segment 38 upwardly.

Following this movement the sleeve 29 will be partially rotated on the axle 25 and the tooth 32 on the upper end of the pawl will ride past a number of the teeth on ratchet wheel 27.

The weight of the operator as he resumes his seat on the saddle will swing the bell crank comprising arms 17 and 18 on its fulcrum so as to move the lower portion of arm 18 forwardly, thereby expanding spring 23 and drawing rod 40 forwardly and through arm 39, shaft 37 will be rotated to swing segment 38 downward. Such action rotates pinion 29 carried by sleeve 28 and the latter carrying the arm 30 and pawl 31 will swing said arm and pawl upward with the result that the tooth 32 at the upper end of the pawl will engage one of the teeth of the ratchet wheel 27 and drive same in a forward direction, consequently driving the velocipede forward for ratchet wheel 27 is connected to the hub of one of the rear wheels 26.

As the alternate rising and lowering movements of the body of the rider continue the velocipede will be driven forward at considerable speed and during such forward movement the velocipede is steered by means of the handle bars that are connected to the upper end of the steering yoke, and which latter carries the steering wheel 13.

The operator of the velocipede in thus alternately raising and lowering his body closely simulates the movements of a person riding horseback, and thus the operator derives both pleasure and exercise during the operation of the vehicle.

When arm 34 is swung into an inclined position above its axis as illustrated by solid lines in Fig. 3, the spring 36 is positioned so that it exerts upward pull on the eye 33 that projects from the back of pawl 31 so that the tooth at the upper end of the pawl is in engagement with the teeth of ratchet wheel 27 and with the parts thus positioned the driving mechanism will always drive the velocipede forward.

In the event that it is desired to drive the velocipede rearwardly, arm 34 is swung into a downwardly inclined position so that the spring 36 will exert a downward pull upon the eye 33, thereby changing the position of the pawl so that the tooth 33 at the lower end thereof will engage the teeth of ratchet wheel 27, and when so positioned the movement of the segment 38 to the sleeve 28 will result in a reverse rotation of the wheel to which the ratchet wheel 27 is connected.

In order to permit the vehicle to coast down grade, the arm 34 may be shifted into an intermediate position, so that the spring 36 will hold the pawl 31 in a neutral position or with both of its teeth out of engagement with the teeth of the ratchet wheel.

Thus it will be seen that I have provided a velocipede that is relatively simple in construction, and which may be readily driven forwardly or rearwardly under movements of the operator, and which movements closely resemble the movements of a person riding horseback.

It will be readily understood that minor changes in the size, form and construction of the various parts of my improved velocipede may be made and substituted for those herein shown and described, without departing from the spirit of my invention, the scope of which is set forth in the appended claims.

I claim as my invention:

1. In a velocipede, a frame, wheels supporting the rear portion thereof, and having a horizontal arm and a vertical arm, a bell crank fulcrumed on the forward portion of the frame, a seat carried by the rear portion of the horizontal arm of the bell crank, a ratchet wheel secured to the hub of one of the wheels at the rear of the frame, an arm mounted for operation adjacent to said ratchet wheel, a reversible pawl carried by said arm, driving connections between the lower end of the vertical arm of the bell crank and the pawl carrying arm, and a retractile spring having one end connected to the frame and the other end adjustably connected to the vertical arm of the bell crank.

2. In a velocipede, a frame, an axle carried by the rear portion of said frame, wheels journaled on the ends of said axle, a bell crank fulcrumed on the forward portion of the frame and having horizontal and vertical arms, a seat carried by the rear portion of the horizontal arm of said bell crank, the vertical arm of the bell crank being provided with a row of apertures, a retractile spring connected to the intermediate portion of the frame of the velocipede, the opposite end of said spring being engaged in one of the apertures in the vertical arm of the bell crank, a ratchet wheel secured to the hub of one of the wheels at the rear of the frame, a member mounted for operation on the axle adjacent to said ratchet wheel, a reversible pawl carried by said member, and driving connections from the lower portion of the vertical arm of the bell crank with said pawl carrying member.

3. In a velocipede, a frame, an axle carried by the rear portion of said frame, wheels journaled on the ends of said axle, a ratchet wheel secured to the hub of one of the wheels, a sleeve mounted for rotation on the axle adjacent to said ratchet wheel, a reversible spring-held pawl carried by said sleeve for engaging the teeth of said ratchet wheel, a pinion fixed on said sleeve, a rock shaft journaled on the rear portion of the frame, a toothed segment carried by said rock shaft and engaging said pinion, a crank arm projecting from said rock shaft, a spring-held seat-carrying bell crank mounted for vertical swinging movement on the forward portion of the frame, and a connection from one of the arms of said bell crank of the crank arm that projects from said rock shaft.

In testimony whereof I affix my signature.

HOWARD K. BURDICK.